(12) United States Patent
Koka et al.

(10) Patent No.: US 8,781,972 B2
(45) Date of Patent: *Jul. 15, 2014

(54) DISTRIBUTED LICENSE MANAGEMENT

(71) Applicant: Flexera Software LLC, San Jose, CA (US)

(72) Inventors: Vikram Venkata Koka, Fremont, CA (US); Sonny Doan Luu, San Jose, CA (US)

(73) Assignee: Flexera Software LLC, San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/161,506

(22) Filed: Jan. 22, 2014

(65) Prior Publication Data

US 2014/0136427 A1 May 15, 2014

Related U.S. Application Data

(63) Continuation of application No. 11/118,946, filed on Apr. 28, 2005.

(51) Int. Cl.
*G06F 21/00* (2013.01)
*G06F 21/10* (2013.01)

(52) U.S. Cl.
CPC .............. *G06F 21/105* (2013.01); *G06F 21/10* (2013.01)
USPC .................... 705/59; 726/18; 726/29; 705/1.1

(58) Field of Classification Search
CPC ............................... G06F 21/10; G06F 21/105
USPC .......................................................... 705/59
See application file for complete search history.

(56) References Cited

U.S. PATENT DOCUMENTS

| 5,704,032 | A | 12/1997 | Badovinatz et al. |
| 6,178,444 | B1 | 1/2001 | Okataku et al. |
| 6,842,896 | B1 | 1/2005 | Redding et al. |
| 6,968,384 | B1 * | 11/2005 | Redding et al. ............... 705/59 |
| 7,035,918 | B1 | 4/2006 | Redding et al. |
| 7,231,461 | B2 | 6/2007 | Laschkewitsch et al. |
| 7,546,366 | B2 * | 6/2009 | Vainio et al. ............... 709/224 |
| 7,716,348 | B1 * | 5/2010 | Redding et al. ............... 705/59 |
| 2002/0169725 | A1 | 11/2002 | Eng |
| 2004/0010469 | A1 | 1/2004 | Lenard et al. |

(Continued)

FOREIGN PATENT DOCUMENTS

WO WO 2006/116159 A2 11/2006

OTHER PUBLICATIONS

White, Ron, "How Computers Work", Millenium Ed., Que Corporation, Indianoplis, IN, 1999.

(Continued)

*Primary Examiner* — Jacob C. Coppola
(74) *Attorney, Agent, or Firm* — Lewis Roca Rothgerber LLP

(57) ABSTRACT

Techniques for distributed license management are provided. Three or more services or servers cooperate and negotiate with one another to establish primary, secondary, and tertiary licensing services. Initially, the primary is designated as a master licensing service and manages a license for a plurality of users over a network. If the primary fails to respond within a configurable period of time to both the secondary and tertiary licensing services, then the secondary dynamically assumes a master licensing service role for purposes of managing the license.

20 Claims, 4 Drawing Sheets

(56) References Cited

U.S. PATENT DOCUMENTS

2005/0015343 A1 1/2005 Nagai et al.
2006/0179058 A1* 8/2006 Bram et al. ................ 707/9
2006/0248017 A1 11/2006 Koka

OTHER PUBLICATIONS

PCT Application No. PCT/US06/15202, International Search Report and Written Opinion dated Sep. 20, 2007.

U.S. Appl. No. 11/118,946, Office Action mailed Dec. 3, 2013.
U.S. Appl. No. 11/118,946, Final Office Action mailed Nov. 26, 2012.
U.S. Appl. No. 11/118,946, Office Action mailed Jan. 27, 2012.
U.S. Appl. No. 11/118,946, Final Office Action mailed May 17, 2010.
U.S. Appl. No. 11/118,946, Office Action mailed Sep. 15, 2009.
U.S. Appl. No. 11/118,946, Final Office Action mailed Jan. 7, 2009.
U.S. Appl. No. 11/118,946, Office Action mailed May 5, 2008.

* cited by examiner

DISTRIBUTED LICENSE MANAGEMENT

CROSS-REFERENCE TO RELATED APPLICATIONS

The present application claims the priority benefit of U.S. patent application Ser. No. 11/118,946 filed Apr. 28, 2005, the disclosure of which is incorporated herein by reference.

BACKGROUND OF THE INVENTION

1. Field of the Invention

The invention relates generally to software licenses and more particularly to techniques for the distributed management of software licenses.

2. Description of the Related Art

Software vendors are continually attempting to enforce and monitor their software licenses. Maintaining and enforcing a software license ensures that a vendor will receive the revenue that it is entitled to for its software product, reasonably ensures the integrity of the software product is not compromised, and reasonably ensures that the intellectual property rights associated with the software product are protected. Vendors invest significant time and effort in managing their software licenses.

At the same time, a vendor cannot be too restrictive or too unreasonable in its attempt to ensure that its license is enforced. In other words, a licensee or a customer will turn toward another product if the conditions and environment associated with a license are unreasonable or impractical for the customer's environment. Consequently, a vendor gives up some control and some piece of mind in order to retain and to attract customers to its software products.

Moreover, in today's highly connected environment customers often desire or insist that licenses be available over a network connection, since the customers' users may be geographically dispersed or networked together when access to a product is needed. Typically, this situation is addressed with a license management service which is installed and executed from a single network node within the customers' environment.

Another reason for having licenses available over a network connection is that users often have to share limited resources of an enterprise over a network. For example, consider a small engineering design company that wants to use an engineering software design package, such as Cadence®. The license for the package can cost several hundred thousand dollars. By purchasing a floating license the company can permit its engineers to access the package over a network connection for purposes of sharing the license, though not at the same time. In this manner, each engineer can have the package available for use but needs the network license to run the package and perhaps only one engineer or a small number of engineers can be executing the package at any point in time. Thus, the limited resource (engineering design package) is managed by a network-installed license, such that the company does not have to purchase the package for all of its engineers.

However, managing a distributed license from a single network node creates a single point of failure and may unduly burden the single network node when it becomes taxed with other network traffic. Moreover, when a node failure occurs manual intervention is needed to bring another different node up for purposes of managing a software license.

It is readily apparent that the conventional approaches to distributed software license management are not optimal and do not create a high availability (HA) response for customers. Accordingly, improved techniques for distributed license management are needed.

SUMMARY OF THE PRESENTLY CLAIMED INVENTION

In various embodiments, techniques for distributed license management are presented. More specifically, and in an embodiment, a distributed license management system is provided. The distributed license management system includes a primary licensing server, a secondary licensing server, and a tertiary licensing server. Initially, the primary licensing server is designated as a master licensing server and it manages a license for users over a network. If communication from the primary licensing server is not detected by both the secondary and tertiary servers, then the secondary licensing server dynamically assumes the role of the master licensing server and dynamically manages the license for the users over the network.

DETAILED DESCRIPTION

As used herein the terms "server" and a "machine" may be used interchangeably. Thus, a server or machine is a processing device capable of processing software services, applications, and/or systems. The server is accessible over a network, and the network communication may be wired, wireless, or a combination of wired and wireless.

A "license" refers to policies associated with using or consuming a software product. Some policies may restrict usage of the software product to certain features of that software product. Other policies may restrict the number of concurrent users or clients which can be simultaneously using the software product. A license management service manages the policies of the license by interpreting and enforcing the policies. In some cases, this is achieved by the license management service providing dynamic keys or license certificates to instances of the software product running on machines of the users (e.g., clients), such that without valid keys the instances of the software product do not execute for the users on their machines.

Various embodiments of this invention can be implemented within existing license management services, within new custom license management services, or as wrappers to license management services. The services or wrappers may be implemented on a plurality of network machines or nodes, such as servers, firewalls, gateways, routers, etc. The service or wrapper is adapted to be executed as multiple instances of itself on a plurality of different network nodes. Each instance assumes a role with respect to the other instances and regularly communicates with the other instances. The techniques and arrangements of such wrappers or services will now be discussed in detail.

Figure 1:
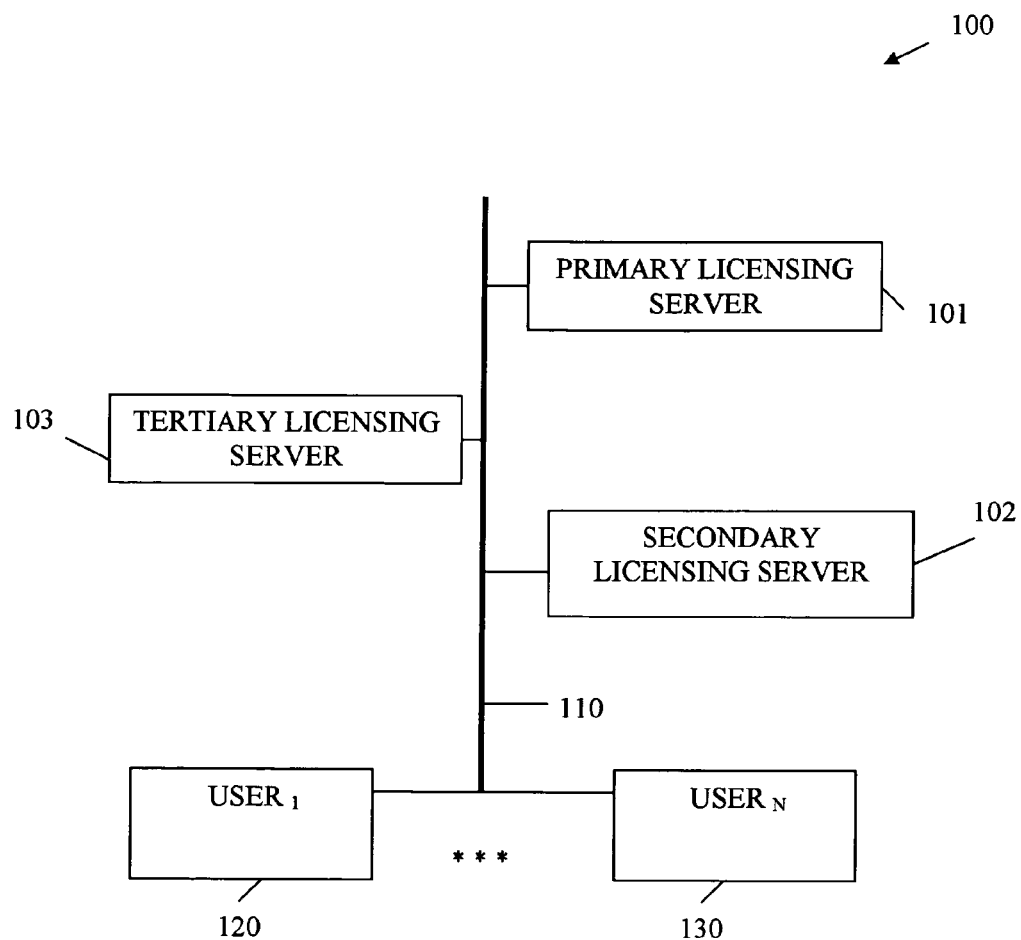
FIG. 1 is a diagram of a distributed license management system, according to an example embodiment.

FIG. 1 is a diagram of a distributed license management system 100, according to an example embodiment. The license management system 100 is implemented in a machine-accessible and readable medium and is operational over a network. The network may be a Local Area Network (LAN) or a Wide Area Network (WAN), such as the Internet.

The license management system 100 includes a primary licensing server 101, a secondary licensing server 102, and a tertiary licensing server 103. The servers 101-103 reside on different machines over a network 110. For purposes of illustration and comprehension the license management system 100 is shown with three licensing servers 101-103 although it is to be understood that the license management system 100 may include N licensing servers, where N is an odd integer number greater than or equal to N/2+1. An odd number of servers N permit quorums to be established amongst the licensing servers 101-103 and roles to be assigned, as will be discussed herein and below.

Initially, the licensing servers 101-103 are configured to interact with one another having assigned role designations. In an embodiment, this configuration and the corresponding initial role designations are identified within a license by the sequential order of the licensing servers 101-103 which appear within the license, such that the first listed licensing server within the license is the primary licensing server 101, the second listed licensing server within the license is the secondary licensing server 102, and the third listed licensing server within the license is the tertiary licensing server 103. It is recognized that other techniques may be used such that the licensing servers 101-103 may assume assigned roles during initial configuration, such as labels (identifying roles) which are associated with Internet Protocol (IP) addresses for the licensing servers 101-103, and the like. All such alternative techniques are intended to fall within the scope of the embodiments presented herein.

The primary licensing server 101 and the secondary licensing server 102 are both capable of assuming the role of a master licensing server during management of the license. A master licensing server distributes keys and enforces policies associated with the license via a vendor license management service that the master licensing server initiates and executes. The tertiary licensing server 103 does not assume the role of a master licensing server; rather the tertiary licensing server 103 serves as a check and balance on the secondary licensing server 102, such that the secondary licensing server 102 cannot unilaterally declare that a primary licensing server 101 is no longer available to serve as the master licensing server for purposes of managing the license.

Initially, the primary licensing server 101 is designated as the master licensing server and assumes management responsibilities of the license. Again, these responsibilities are fulfilled via the proper vendor license daemon that the master licensing server executes on behalf of the users 120-130. The license is distributed over the network 110 to a plurality of users 120-130. Each of the licensing servers 101-103 regularly communicate with one another over the network 110. In an embodiment, this regular communication is achieved via heartbeat signals. The interval or period of elapsed time between heartbeat signals is configurable.

Additionally, the licensing servers 101-103 are configured to know a threshold value for the maximum number of intervals after which if there is no heartbeat signal received from a currently designated master licensing server, then it is assumed a new master licensing server is to be designated. Stated another way, the threshold value permits the secondary 102 and tertiary 103 licensing servers to determine when they should assume that a primary licensing server 101 is down, such that it becomes necessary for the secondary licensing server 102 to assume the role as the master licensing server and to begin managing the license over the network 110 on behalf of the users 120-130. A secondary licensing server 102 which becomes a master licensing server manages the license by initiating and executing the proper vendor license management server daemon on the machine associated with the secondary licensing server 102.

The secondary licensing server 102 needs the approval of the tertiary licensing server 103 to assume the role as a master licensing server for the license. Additionally, the secondary licensing server 102 cannot make unilateral assertions to the tertiary licensing server 103, which the tertiary licensing server 103 can rely upon to provide its assent for a re-designation of the master licensing server. In this manner, if the secondary licensing server 102 loses communication with the primary licensing server 101 but the primary licensing server 101 is otherwise operational as evidenced by its communications with the tertiary licensing server 103, then when the secondary licensing server 102 attempts to acquire assent of the tertiary licensing server 103 to become the master licensing server, the tertiary licensing server 103 will deny the request and the primary licensing server 103 will remain the master licensing server.

The primary licensing server 101 may fail in one of two ways via a fail-stop or via a fail-busy. With a fail-stop condition, an application administering the license (e.g., the vendor's license management service daemon) executing on the primary licensing server 101 stops and can no longer handle any work. Some examples of a fail-stop condition include a vender license daemon that is manually killed, the primary licensing server 101 crashes, etc. Operating system (OS) functions can be used to raise events and communicate fail-stop conditions, such that accounting for these situations is more easily achieved than they are with a fail-busy condition.

With a fail-busy condition, the vendor licensing daemon appears to be processing but it is does not respond. Some examples that may cause a fail-busy condition include a deadlock within the application, network congestion, a network link failure, etc. Fail-busy conditions are detected with the use of heartbeat communications between the licensing servers 101-103 and through the use of a heartbeat interval and a threshold value.

The heartbeat interval is the regular period during which heartbeat signals are communicated amongst the licensing servers 101-103. The threshold is the maximum number of intervals after which if no heartbeat signal is received from a master licensing server it is assumed that a fail-busy condition has occurred and a new designation of the master licensing server needs to occur to maintain continuity in license management for the users 120-130 over the network 110. Furthermore, to ensure a rogue secondary licensing server 102 does not disrupt a non failure condition, the secondary licensing server 102 and the tertiary licensing server 103 both agree and independently verify that the primary licensing server 101 is non responsive, which ensures a legitimate fail-busy condition is detected.

The heartbeat signal itself may include various types of information which may be useful to each of the licensing servers 101-103. For example, the heartbeat signal may include an originator identifier and a sequential number, such that the recipients of the signal can identify the sender and identify the order of the signal relative to other signals. Moreover, each heartbeat signal does not have to be acknowledged; rather a particular licensing server 101-103 may elect to respond only to the latest received heartbeat signal.

In an embodiment, the heartbeat signal may also include state information associated with the license being managed. That is, a heartbeat signal from a current master licensing server may include user identities that currently have valid access to the license. This may be useful should a primary licensing server 101 fail and the secondary licensing server 102 assume the role as the new master licensing server.

For example, assume that a particular distributed license only permits 5 simultaneous users to be running a software product but the demand for the product is much greater. If 5 users are validly running the software product when a primary licensing server 101 experiences a failure and the secondary licensing server 102 is dynamically re-designated as the new master licensing server then it is likely that different users may acquire a key for the software product when the secondary licensing server 102 assumes the role of the master licensing server and initiates the proper vendor license daemon. However, if the new master licensing server can recreate the licensing state then the original 5 users will be given priority and given a key to continue using the software product. Thus, prior user continuity is maintained even when a new master licensing server is dynamically re-designated.

In some embodiments, the heartbeat signal may include a reference to a storage or memory location where a license state can be found. In another embodiment, the state information may be written to independent storage locations by master licensing servers and the storage location may be configured within the licensing servers 101-103 via runtime parameters, environmental variables, and the like. Alternatively, the heartbeat signal may actually include the license state in an uncompressed or compressed format.

During operation of the license management system 100, the primary licensing server 101 serves as the master licensing server if it is operational and successfully communication to at least one of the two remaining licensing servers 102 and 103. While acting as the master licensing server, the primary licensing server 101 initiates and executes a vendor license management service daemon that interprets and enforces policies associated with a software license on behalf of users 120-130 over the network 110.

The primary licensing server 101 continuously and regularly communicates with the secondary licensing server 102 and the tertiary licensing server 103 over the network. In some cases, this communication is achieved via heartbeat signals at regular intervals (heartbeat intervals) in the manner discussed above. For example, the licensing servers 101-103 may send heartbeat signals to one another every 20 seconds.

The secondary licensing server 102 and the tertiary licensing server 103 detect when the primary licensing server 101 has apparently entered into a fail-busy condition. For example, when 3 heartbeat intervals elapse without having heard from the primary licensing server 101. Both the secondary 102 and the tertiary 103 licensing servers must agree that the lack of or delayed communications emanating from the primary licensing server 101 warrant a dynamic and real-time change in designation of the master licensing server.

When this occurs, the secondary licensing server 102 assumes the role of the master licensing server. This means that the secondary licensing server 102 initiates and executes a version of the vendor license management service daemon and the software license is managed via the machine associated with the secondary licensing server 102. In some embodiments, as discussed above, the secondary licensing server 102 may use saved state information to interact with the vendor license daemon for purposes of recreating a licensing state once the secondary licensing server 102 is re-designated as the master licensing server.

If the primary licensing server 101 regains communication capabilities, by contacting either the secondary licensing server 102 or the tertiary licensing server 103, then the secondary licensing server 102 relinquishes control as the master licensing server and the primary licensing server 101 re-establishes itself as the master licensing server by re-initiating and re-executing the proper vendor license daemon.

During initial startup and through out the processing lifecycle of the license management system 100, the licensing servers 101-103 establish and maintain a quorum amongst them. The vendor license daemons do not participate in this quorum resolution. After the quorum is resolved, the vendor license daemons are initiated on the licensing servers 101-103. Even though each licensing server 101-103 may initiate a vendor license daemon, it is only the master licensing server that distributes licenses or keys to the users 120-130 at any particular point in time.

In some embodiments, each vendor license daemon may establish independent heartbeat communications with its licensing server 101-103 for purposes of continuously confirming the status of the quorum and the status of the licensing server 101-103 that is presently designated as the master licensing server. The vendor license daemons may be configured to shut down by themselves when they are not able to communicate with their corresponding licensing server 101-103. This ensures that the distributed license is being centrally managed and that rogue versions of a vendor license daemon have not been improperly initiated.

A variety of configuration operations may be beneficially established by an administrator for the license management system 100. For example, the heartbeat interval and the threshold value for the number of intervals may be configured at runtime for the license management system 100. Moreover, each licensing server 101-103 may independently include upper and lower limits for the heartbeat interval and the threshold value, such that any attempt to exceed these upper and lower limits via runtime configuration parameters will not be recognized by the licensing servers 101-103.

Additionally, the fact that the primary licensing server 101 is to be the master licensing server when the primary 101 is operational may be configured as an option. Thus, the primary licensing server 101 may not always automatically become the master if it loses its status as the master and then regains communication capabilities. In other words, this condition is configurable.

Figure 2:
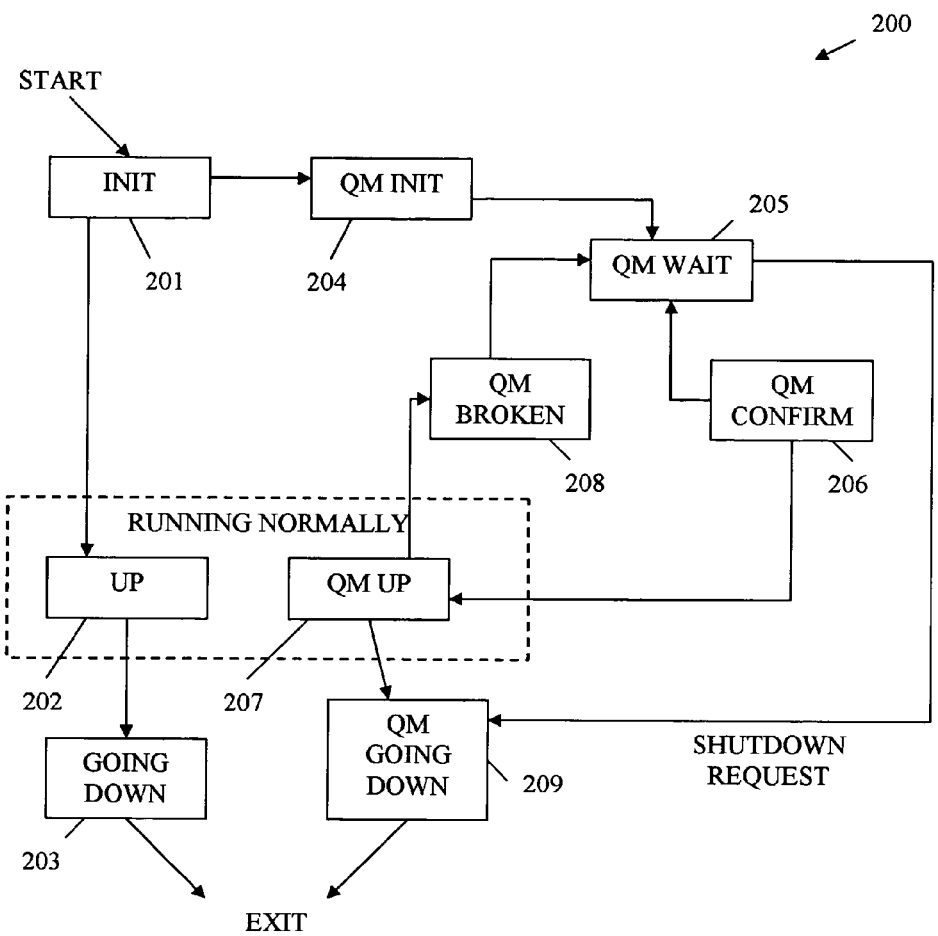
FIG. 2 is a diagram of an example state diagram for the distributed license management system of FIG. 1, according to an example embodiment.

FIG. 2 is a diagram of an example state diagram 200 for the distributed license management system 100 of FIG. 1, according to an example embodiment. Each of the licensing servers 101-103 or services execute on different machines over the network 110. The licensing servers 101-103 may at any point in time be in a particular processing state. An example state diagram 200 is depicted in FIG. 2. Each of these states will now be discussed in turn.

When a licensing server 101-103 is started, it enters an initial state (Init) 201. This is a purely transitional state while the licensing server 101-103 is reading the license file; attempting to setup a communication socket over the network 110 to listen on, and the like.

The Up state 202 is a regular operational state for a licensing server 101-103 that is not participating in a multiple and distributed license management system 100. That is, a licensing server 101-103 in an Up state 202 is singularly managing a license without relying on communications with other ones of the licensing servers 101-103. This may be viewed as a single license management mode.

The Going Down state 203 is a transitory state where the licensing server 101-103 has started to go down and is processing clean up operations before exiting normally.

The QM (quorum) Init state 204 is an initial state of a licensing server 101-103 as it comes up in a distributed license management system 100 arrangement. This may still be viewed as a transitory state while the licensing server 101-103 is attempting to perform initializations and attempting to see if any of the other licensing servers 101-103 in the quorum are up and running over the network 110.

The QM Wait state 205 is a state of the licensing server 101-103 after it has tried to contact the other remaining licensing servers 101-103, but has not yet hear back from any of them via an acknowledgment. The licensing server 101-103 is waiting to hear from another licensing server 101-103 and has not yet determined the identity of the proper master licensing server. This may also be the state if two licensing servers 101-103 in contact are the secondary licensing server 102 and the tertiary licensing server 103 and the two have tentatively agreed that the secondary licensing server 102 should be the master licensing server, but they are still waiting for a bit longer to see if the primary will come up in time to remain the master and prevent the dynamic re-designation.

The QM Confirm state 206 is a state where the master licensing server has been resolved and the licensing server 101-103 has contacted or been contacted by at least one other licensing server 101-103 who agrees with the master licensing server designation. The licensing server 101-103 in this state is waiting for confirmation from remaining licensing servers 101-103 of the quorum before proceeding.

In the QM Up state 207, the master licensing server has been resolved by at least a quorum of the licensing servers 101-103 and the quorum is up and running with a proper designated master licensing server that manages the license for the users 120-130 over the network 110 via its vendor license daemon.

The QM Broken state 208 is a state where the licensing server 101-103 designated as the current master licensing server has gone down or become unresponsive via a fail-stop or a fail-busy condition. This may also occur when the quorum appears to have been broken. The licensing servers 101-103 who were in the quorum go into this transitory state to clean up and re-initialize quorum setup before entering the QM Wait state 205.

With the QM Going Down state 209, the licensing servers 101-103 have been instructed to shutdown and they enter a state where they are each in a process of cleaning up before exiting.

In addition to the states depicted in the state diagram 200, the licensing servers 101-103 may communicate with one another via a variety of different messages beyond the heartbeat signals discussed above. Some example messages are now presented.

In some cases, all the messages have a unique (sequentially increasing number) transactional identifier (id) which is generated by the licensing server 101-103 that is originating the message. Any message sent as a response to another message may include the same transactional id. Each message may also include the licensing server's (originator's) name.

A "WHO" message is a first message sent by a licensing server 101-103 to initiate discussions with any other licensing servers 101-103 within a quorum. It is intended to say "tell me the current state." The message may include the version of the licensing server 101-103, the licensing server's 101-103 configuration, and the perceived designated roles and configuration of the quorum for the licensing servers 101-103.

A "WHO(M)" message is sent by the primary 101 and secondary 102 licensing servers as part of startup or initialization. It is similar to the "WHO" message but has one additional element which is a "master candidate name." Initially, both the primary 101 and the secondary 102 licensing servers can nominate themselves as candidates to be the master licensing server.

It is to be noted, that in some embodiments, the "WHO (M)" message may be combined with the "WHO" message with an additional parameter to uniquely distinguish the "WHO (M)" message. In fact, it should be noted that the messages are presented herein as an example embodiment and it is recognized that other messages or combinations of the messages presented herein may be made without departing from the teachings presented with this invention.

A "STATUS" message is the most common message sent out by the licensing servers 101-103 and contains the current quorum's status information as known by the sending licensing server 101-103. It may include the following elements, master licensing server's name, quorum status, status of configured licensing servers 101-103 as known by the sending licensing server 101-103. In some embodiments, the "STATUS" message may also include the time for purposes of allowing the licensing servers 101-103 to keep their clocks in synchronization with one another.

The "CONFIRM" message is sent by the master licensing server to the other licensing servers 101-103 of the quorum to make sure that everyone is in agreement as to who the master licensing server is. This message includes the master licensing server's name.

A "CONFIRMOK" message is sent by the non master licensing servers 101-103 (slaves) in response to receiving a "CONFIRM" message from the current master licensing server. This message includes an agree field having a value of yes or no.

The "UP" message is sent by the master licensing server to the remaining licensing servers 101-103 of the quorum to tell them that the quorum is now properly up and running normally and to tell them that negotiating amongst the licensing servers 101-103 for purposes of establishing a master licensing server has ended. This really just lets the slaves know that all the necessary "CONFIRMOK" messages have been received and that they should all set their statuses to the Quorum Up state 207.

A "BADPARM" message is used as a response to a "WHO" message when a parameter mismatch is discovered by the recipient.

The "SHEARTBEAT" AND SHEARTBEATOK" messages are not quorum messages; rather these are licensing server 101-103 heartbeat messages to keep track of the health of the licensing servers 101-103. These are used by the licensing servers 101-103 in the manners discussed above after a quorum is established. Separate heartbeat signals may be used by each licensing server 101-103 in its communications with its vendor license daemon.

A variety of global states or conditions may exist for the license management system 100. Each of these will now be enumerated with the following nomenclature for purposes of illustration. The primary licensing server 101 is referred to as "E" the secondary licensing server 102 is referred to as "S," and the tertiary licensing server 103 is referred to as "T."

The possible operational scenarios for the license management system 100 during which a quorum is capable are as follows: PS (P up, S up, T down); PST (P up, S up, T up); PT (P up, S down, T up); and ST (P down, S up, T up). A quorum cannot be established if only a single licensing server 101-103 is up while the others are down (P, S, or T).

Additionally, the timing of when the licensing servers 101-103 become available can result in different permutations of the license management system 100. For example, SP (S up before P); SPT (S up first, then P, and then T); STP (S up first, then T, and then P); TP (T up and then P); and TS (T up and then S). It should also be noted that because of potential failures it is possible for a startup sequence of the license management system 100 to change from one to the other during the lifetime of a quorum.

The license management system 100 may also deploy a variety of beneficial error handling techniques. In general, one approach to error handling is to reinitialize the quorum state and go back to QM Wait 205 upon a detected quorum failure and to retry as is appropriate.

Another failure may be a peer detected failure; this is when a licensing server 101-103 comes up in isolation and cannot detect any of the other licensing servers 101-103 for purposes of establishing a quorum. Here, the licensing server 101-103 goes into the QM Wait state 205. The licensing server 101-103 in this condition may start a peer detection timer and if the licensing server 101-103 has not received any connection by the time the timer expires, the licensing server 101-103 tries to manually contact its peers and if unsuccessful goes back into the QM Wait state 205.

A blocking failure in a QM Confirm state 206 occurs when there is a disagreement as to who the master licensing server is. If this occurs, it is possible to remain in a deadlock condition such that there is an infinite block. To handle this, all the licensing servers 101-103 start a confirm timer when they enter the QM Confirm state 206. If the slave-to-be licensing servers 101-103 do not hear anything from the mater-to-be licensing server 101-103 for the period of the timeout, then they all abort quorum confirmation and treat it as a broken quorum where they reinitialize and go back to the QM Wait state 205.

In addition to messages and error handling, the license management system 100 may also include a variety of maintenance utilities. Some example, maintenance utilities include shutting down a single licensing server 101-103 within an active quorum; a manual operation to dynamically force a re-designation of the master licensing server within the quorum; and operations to capture and track diagnostics from the quorum. Diagnostics may be useful for debugging situations where different elements of the quorum have different views f the status of the quorum.

Figure 3:
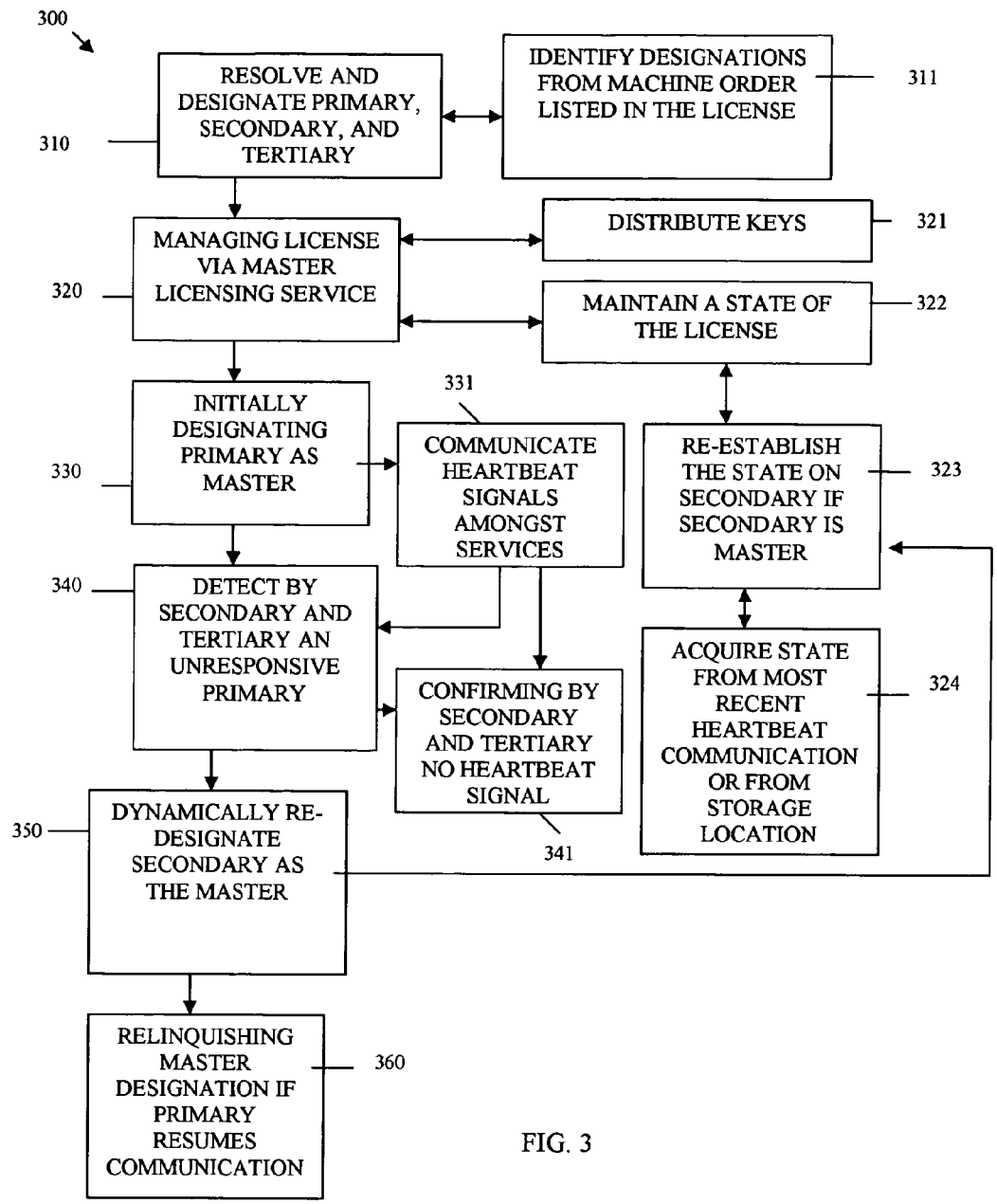
FIG. 3 is a diagram of a method for distributed license management, according to an example embodiment.

FIG. 3 is a diagram of a method 300 for distributed license management, according to an example embodiment. The method 300 (hereinafter license management service") is implemented in a machine-accessible and readable medium and is operational over a network. In an embodiment, the license management service is implemented on each licensing server 101-103 of the license management system 100 for purposes of collaboratively managing a distributed software license on behalf of a plurality of clients or users 120-130.

At 310, the license management service resolves and designates roles of different executing instances of a licensing service. Each of these instances is executing on a different machine over a network. The network may be a LAN or a WAN (e.g., Internet). During negotiations between the license service instances, a primary licensing service, a secondary licensing service, and a tertiary licensing service are designated for an initial quorum. Furthermore, the master licensing service is initially identified as the primary licensing service.

In an embodiment, at 311, the designations of the primary, secondary, and tertiary are resolved by machine order appearing within the software license, which is being managed.

At 320, the license management service manages the license via the master licensing service. To do this, initially, the primary licensing service initiates a vendor licensing management daemon service. In an embodiment, at 321, the vendor licensing service executing on the machine of the primary licensing service dynamically distributes the license via keys that are supplied to the users of clients. The users or clients independently execute instances of a software product associated with the license on their machines over the network and are capable of successfully running the software product as long as they have a valid key distributed via the vendor licensing daemon that executes on the machine of the licensing service designated as the master licensing service.

In an embodiment, at 322, license management service may also maintain a state of the license that is being managed via the master licensing service. For example, the master licensing service may regularly log the identities of users or clients that are connected to the vendor licensing service and actively using the software product.

According to an embodiment, at 323, if the current master licensing service is subsequently re-designated to the secondary licensing service then the new master licensing service may re-establish a previous saved state of the license. At 324, the state may be acquired from a most recent heartbeat communication from the previous master licensing service or from an independent storage location that was written to by the previous master licensing service and that was independent of the machine that processed the previous master licensing service.

Again, at 330, the license management service initially designates the primary licensing service as the master licensing service. During operation of the primary, secondary, and tertiary licensing services and in an embodiment, at 331, each of them communicate with the remaining licensing services via heartbeat signals. In fact, any form of communication amongst the licensing services is acceptable and may be used.

At some point during operation of the license management service, at 340, the secondary and tertiary licensing services detect that the primary licensing service is unresponsive. In an embodiment, at 341, both the secondary licensing service and the tertiary licensing service independently confirm on their own that the primary licensing service is not communicating heartbeat signals or other agreed upon communications over the network.

Assuming that both the secondary and tertiary licensing services have agreed that the primary licensing service is in a fail-stop or fail-busy condition, then, at 350, the license management service dynamically re-designates in real time the secondary licensing service as a new current master licensing service. In some cases, where state of the license was maintained by the prior master licensing service, the state may be re-established on the secondary licensing service at 323. The vendor license daemon executing on the same machine as the secondary licensing service is informed that it is now the master and the license is managed. The vendor license daemon may already be executing on the secondary licensing service's machine, or may be initiated when needed by the secondary licensing service upon the re-designation of the secondary licensing service as the new master licensing service.

In an embodiment, at 360, the secondary licensing service will automatically and dynamically relinquish control as the master licensing service when the primary licensing service is capable of again communicating with the secondary licensing service and/or the tertiary licensing service. Again, this processing scenario may be configured within the license management service and therefore does not have to always be the case.

Figure 4:
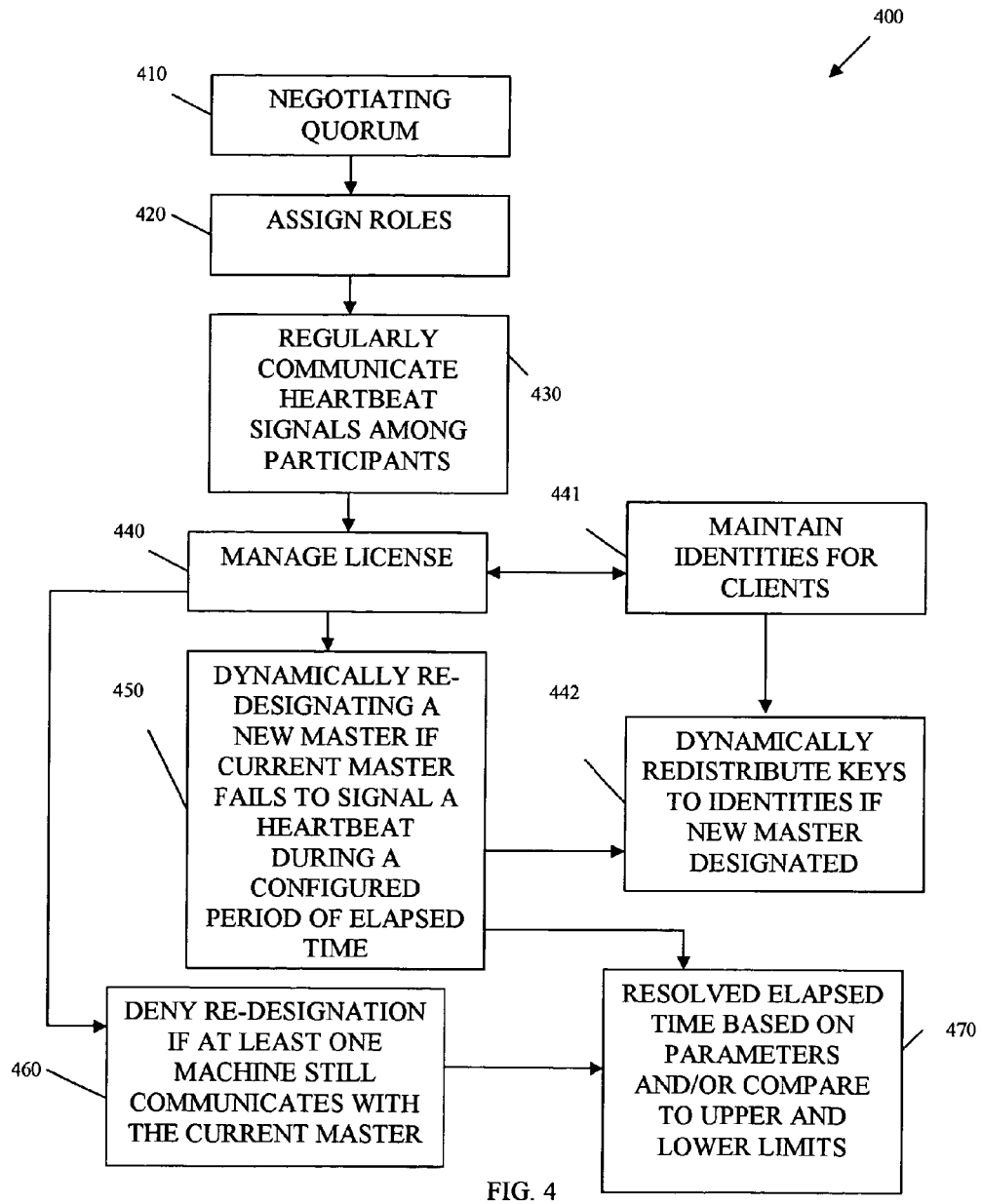
FIG. 4 is a diagram of another method for distributed license management, according to an example embodiment.

FIG. 4 is a diagram of another method 400 for distributed license management, according to an example embodiment. The method is implemented as instructions in a machine accessible and readable medium. The instructions when loaded to a machine and executed perform the processing depicted in FIG. 4.

Initially, the instructions may reside on removable media and interfaced to a machine where they are uploaded to the machine and executed. Alternatively, the instructions may reside on a remote storage location or remote machine over a network and downloaded to a different network machine where they are executed. In still other arrangements, the instructions are prefabricated within storage and/or memory associated with a machine and is executed by the machine. It should also be noted, that the instructions need not contiguously reside within a single medium. That is, in some cases the instructions may be acquired from a plurality of disparate media and processed by a machine.

The instructions are capable of being executed in duplicate over a network from a plurality of network machines or nodes. Each individual instance of the instructions is capable of performing the processing of the method 400 in cooperation with the other remaining network instances of the instructions.

At 410, the instructions negotiate a quorum between three or more network machines, such that roles for each member of the quorum are dynamically established, at 420, during initialization of the instructions. During this processing, a master licensing service is selected and identified as being associated with a specific one of the network machines. The master licensing service is responsible for managing a software license over a network for a plurality of users or clients. One technique for doing this is having the master licensing service designate its vendor license daemon for the software license as the master.

At 430, the instructions facilitate the regular communication of heartbeat signals amongst the machines over the network while the license is independently being managed by the master licensing service via its vendor license daemon at 440. In an embodiment, at 441 the instructions may maintain the identities of clients that are actively consuming or using the license. This may prove useful when a different machine dynamically assumes the role of the master licensing service, such that the recorded identities may be given priority to receive, at 442, redistributed keys for a software product associated with the license by any newly re-designated master licensing service.

If a current master licensing service fails to send a heartbeat signal during a configured period of elapsed time, then, at 450, the instructions dynamically re-designate a new master licensing service from a different one of the network machines. In an embodiment, a threshold may be used by the machines to determine when to declare a current master licensing service as being down or unresponsive. A discussion of a threshold and heartbeat intervals was provided above with respect to the license management system 100 of FIG. 1.

Before a re-designation occurs, the each of the machines not associated with the current master licensing service must not be capable of communication with the machine identified as the current master licensing service. Thus, if at least one machine is still in communication with a current master licensing service, then, at 460, an attempt by a different machine to acquire a change in the designation of the current master licensing service will be denied.

According to an embodiment, at 470, the elapsed period of time during which the machine associated with the current master licensing service is deemed unresponsive may be supplied as a configuration parameter to the instructions. Additionally, the configuration parameter may be compared to upper and lower limits or bounds which are maintained independently by each of the machines, such that the configuration parameter for an elapsed period of time may not fall below a predefined limit or exceed a predefined upper limit.

It has now been demonstrate how a distributed software license may be managed over a network for a plurality of users. The license is not solely managed from a single network node; thus, there is not a single point of failure. Moreover, when a failure of a master node does occur the license may be dynamically re-established and automatically re-established without manual intervention on a different network node.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

The Abstract is provided to comply with 37 C.F.R. .sctn. 1.72(b) and will allow the reader to quickly ascertain the nature and gist of the technical disclosure. It is submitted with the understanding that it will not be used to interpret or limit the scope or meaning of the claims.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus the following claims are hereby incorporated into the Description of the Embodiments, with each claim standing on its own as a separate exemplary embodiment.

What is claimed is:

1. A system for distributed license management, the system comprising:
    a primary licensing server programmed to manage a license for a plurality of users over a network, wherein the primary licensing server is designated as a master licensing server for the license and communicates heartbeat signals at periodic intervals to one or more other licensing servers in the network, wherein each heartbeat signal includes identities of the plurality of users that currently have valid access to the license;
    a tertiary licensing server programmed to:
        independently verify whether heartbeat signals have been received from the primary licensing server, and
        approve requests to assume the master designation when no heartbeat signals are received from the primary licensing server within a predetermined period of time; and
    a secondary licensing server programmed to:
        request approval from the tertiary licensing server to assume the master designation when the secondary licensing server determines that no heartbeat signals have been received from the primary licensing server within the predetermined period of time,
        receive a response from the tertiary licensing server regarding approval for the request, and assume the master designation based on the received response indicating approval of the request.

2. The system of claim 1, wherein the secondary licensing server automatically requests approval from the tertiary licensing server to become the master licensing server when the secondary licensing server determines that no heartbeat signals have been received from the primary licensing server within the predetermined period of time.

3. The system of claim 1, wherein the designation as the master licensing server is automatically relinquished by the secondary licensing server back to the primary licensing server once the secondary licensing server determines that new heartbeat signals from primary licensing server have been received at either the secondary or tertiary licensing servers within a last predetermined period of time.

4. The system of claim 1, wherein the predetermined number of intervals is a configuration parameter provided to the primary, second, and tertiary servers.

5. The system of claim 4, wherein the predetermined period of time is configurable and the periodic intervals are configurable.

6. The system of claim 1, wherein communications from the primary licensing server to the secondary and tertiary licensing servers include licensing state information for the users, and wherein assumption of the master licensing server designation by the secondary licensing server includes processing the state information to produce a state of the license on the secondary licensing server which existed during a last successful communication from the primary licensing server.

7. A method for distributed license management, the method comprising:
   managing a license for a plurality of users over a network, wherein the license is initially managed by a primary licensing server designated as the master licensing server;
   communicating heartbeat signals at periodic intervals from the primary licensing server to one or more other licensing servers in the network, wherein each heartbeat signal includes identities of the plurality of users that currently have valid access to the license;
   detecting that no heartbeat signals have been received at a secondary licensing server from the primary licensing server within a predetermined period of time;
   requesting approval from a tertiary licensing server for the secondary licensing server to assume the master designation;
   independently verifying at the tertiary licensing server that no heartbeat signals have been received from the primary licensing server within the predetermined period of time;
   approving the request to assume the master designation when no heartbeat signals are received at the tertiary licensing server from the primary licensing server within a predetermined period of time, and
   sending a response from the tertiary licensing server to the secondary licensing server regarding the approved request, wherein the secondary licensing server is allowed to assume the master designation.

8. The method of claim 7, further comprising:
   maintaining information in memory regarding a state of the license with respect to the plurality of users; and
   recreating the state of the license on the secondary licensing server when the secondary licensing server is designated the master licensing server.

9. The method of claim 8, further comprising providing the secondary licensing server with the information regarding the state of the license from the primary server, wherein the information is acquired from:
   a most recent heartbeat communication when the primary licensing server was responsive; or
   a storage location written to by the primary licensing server, wherein the storage location is independent of a machine associated with the primary licensing server.

10. The method of claim 7, further comprising communicating heartbeat signals at periodic intervals among the primary, secondary, and tertiary licensing servers.

11. The method of claim 10, wherein detecting that no heartbeat signals have been received from the primary licensing server further includes confirming that both the secondary and the tertiary licensing servers have not received any heartbeat signals from the primary licensing service within a predetermined period of time.

12. The method of claim 7, further comprising the secondary licensing server relinquishing the designation as the master licensing server when the primary licensing server re-establishes communication with the secondary licensing server or the tertiary licensing server.

13. The method of claim 7, further comprising identifying designations for the primary, secondary, and tertiary services from an order of each machine listed in the license.

14. The method of claim 7, wherein managing the license comprises distributing keys to application instances associated with the license and executing on machines located over the network and associated with the users, and wherein the keys permit the application instances to properly execute for the users.

15. A non-transitory computer-readable storage medium having stored thereon a plurality of instructions, the plurality of instructions executable by a computer to perform a method for distributed license management, the method comprising:
   managing a license for a plurality of users over a network, wherein the license is initially managed by a primary licensing server designated as the master licensing server;
   communicating heartbeat signals at periodic intervals from the primary licensing server to one or more other licensing servers in the network, wherein each heartbeat signal includes identities of the plurality of users that currently have valid access to the license;
   detecting that no heartbeat signals have been received at a secondary licensing server from the primary licensing server within a predetermined period of time;
   requesting approval from a tertiary licensing server for the secondary licensing server to assume the master designation;
   independently verifying at the tertiary licensing server that no heartbeat signals have been received from the primary licensing server within the predetermined period of time;
   approving the request to assume the master designation when no heartbeat signals are received at the tertiary licensing server from the primary licensing server within a predetermined period of time, and
   sending a response from the tertiary licensing server to the secondary licensing server regarding the approved request, wherein the secondary licensing server is allowed to assume the master designation.

16. The non-transitory computer-readable storage medium of claim 15, further comprising additional instructions executable to maintain identities of the clients who are consuming the license while the license is being managed.

17. The non-transitory computer-readable storage medium of claim 16, further comprising additional instructions executable to automatically redistribute keys for the license to the client identities over the network when the master licensing service is re-designated.

18. The non-transitory computer-readable storage medium of claim 15, further comprising additional instructions executable to deny the request for the third machine to assume the designation of master licensing server if at least one of the machines is still successfully communicating with the current master licensing service.

19. The non-transitory computer-readable storage medium of claim 15, further comprising additional instructions executable to resolve a configurable period of elapsed time on each of the machines in response to configuration parameters supplied to each of the machines during startup.

20. The non-transitory computer-readable storage medium of claim 19, further comprising additional instructions executable to compare the configurable period of elapsed time against upper and lower limits maintained within services executing on each of the machines, and wherein the machines do not permit the configurable period of elapsed time to fall below the lower limit or to go above the upper limit.

\* \* \* \* \*